US012580209B2

(12) United States Patent
Kaku et al.

(10) Patent No.: US 12,580,209 B2
(45) Date of Patent: Mar. 17, 2026

(54) REDOX FLOW BATTERY

(71) Applicant: SUMITOMO ELECTRIC INDUSTRIES, LTD., Osaka (JP)

(72) Inventors: Hirokazu Kaku, Osaka (JP); Ryouta Tatsumi, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 476 days.

(21) Appl. No.: 18/022,825

(22) PCT Filed: Aug. 6, 2021

(86) PCT No.: PCT/JP2021/029448
§ 371 (c)(1),
(2) Date: Feb. 23, 2023

(87) PCT Pub. No.: WO2022/064883
PCT Pub. Date: Mar. 31, 2022

(65) Prior Publication Data
US 2023/0307672 A1 Sep. 28, 2023

(30) Foreign Application Priority Data
Sep. 23, 2020 (JP) ................................ 2020-159077

(51) Int. Cl.
*H01M 8/04082* (2016.01)
*H01M 8/18* (2006.01)

(52) U.S. Cl.
CPC ....... *H01M 8/04201* (2013.01); *H01M 8/188* (2013.01)

(58) Field of Classification Search
CPC .......................... H01M 8/04201; H01M 8/188
See application file for complete search history.

(56) References Cited

U.S. PATENT DOCUMENTS

2006/0183016 A1 * 8/2006 Kazacos ................. B60L 50/64
429/105
2012/0045680 A1 2/2012 Dong et al.
(Continued)

FOREIGN PATENT DOCUMENTS

JP S63-045761 A 2/1988
JP 2003-303611 A 10/2003
(Continued)

OTHER PUBLICATIONS

Park Jong Ho et al.; "Capacity Decay Mitigation by Asymmetric Positive/Negative Electrolyte Volumes in Vanadium Redox Flow Batteries"; CHEMSUSCHEM; vol. 9; No. 22; Oct. 21, 2016; pp. 3181-3187.

*Primary Examiner* — Brittany L Raymond
(74) *Attorney, Agent, or Firm* — Oliff PLC

(57) ABSTRACT
A redox flow battery includes a positive electrolyte containing a positive electrode active material and a negative electrolyte containing a negative electrode active material. A liquid amount of the positive electrolyte is different from a liquid amount of the negative electrolyte. Of the positive electrolyte and the negative electrolyte, a liquid amount ratio of the electrolyte larger in liquid amount to the electrolyte smaller in liquid amount is not lower than 1.05 and not higher than 5.0. A state of charge of a mixture electrolyte which is a mixture of the positive electrolyte and the negative electrolyte at a ratio equal to the liquid amount ratio is equal to or higher than 2%.

9 Claims, 2 Drawing Sheets

(56)     References Cited

U.S. PATENT DOCUMENTS

2013/0045400 A1*  2/2013  Dong ................... H01M 8/188
                                                      429/105
2018/0013156 A1   1/2018  Yamanishi et al.
2019/0103622 A1   4/2019  Lee et al.

FOREIGN PATENT DOCUMENTS

JP      2006-253023  A    9/2006
JP      2006-520520  A    9/2006
JP      2011-233372  A    11/2011
JP        2012-9448  A    1/2012
JP      2017-505513  A    2/2017
WO      2004/082056  A1   9/2004
WO      2012/094674  A2   7/2012
WO      2015/099654  A1   7/2015
WO      2016/117264  A1   7/2016
WO      2018/070683  A1   4/2018
WO      2018/101969  A1   6/2018

* cited by examiner

REDOX FLOW BATTERY

TECHNICAL FIELD

The present disclosure relates to a redox flow battery.

The present application claims priority to Japanese Patent Application No. 2020-159077 filed on Sep. 23, 2020, the entire contents of which are herein incorporated by reference.

BACKGROUND ART

PTL 1 discloses, as a method of operation of a redox flow battery, transferring an electrolyte in one tank to the other tank through a pipe when valence balance between a positive electrolyte and a negative electrolyte deviates from 3.5.

PTL 2 discloses a method of determining a distribution of electrolytes in a flow battery. The flow battery is supplied with a negative electrolyte and a positive electrolyte each having an active material. The method described in PTL 2 is configured to determine an average oxidation state of the active material in the positive electrolyte and the negative electrolyte. Responsive to the determined average oxidation state, a molar ratio of the active material between the positive electrolyte and the negative electrolyte is adjusted.

CITATION LIST

Patent Literature

PTL 1: Japanese Patent Laying-Open No. 2003-303611
PTL 2: Japanese National Patent Publication No. 2017-505513

SUMMARY OF INVENTION

A redox flow battery in the present disclosure includes a positive electrolyte containing a positive electrode active material and a negative electrolyte containing a negative electrode active material, a liquid amount of the positive electrolyte is different from a liquid amount of the negative electrolyte, of the positive electrolyte and the negative electrolyte, a liquid amount ratio of the electrolyte larger in liquid amount to the electrolyte smaller in liquid amount is not lower than 1.05 and not higher than 5.0, and a state of charge of a mixture electrolyte which is a mixture of the positive electrolyte and the negative electrolyte at a ratio equal to the liquid amount ratio is equal to or higher than 2%.

DETAILED DESCRIPTION

Figure 1:
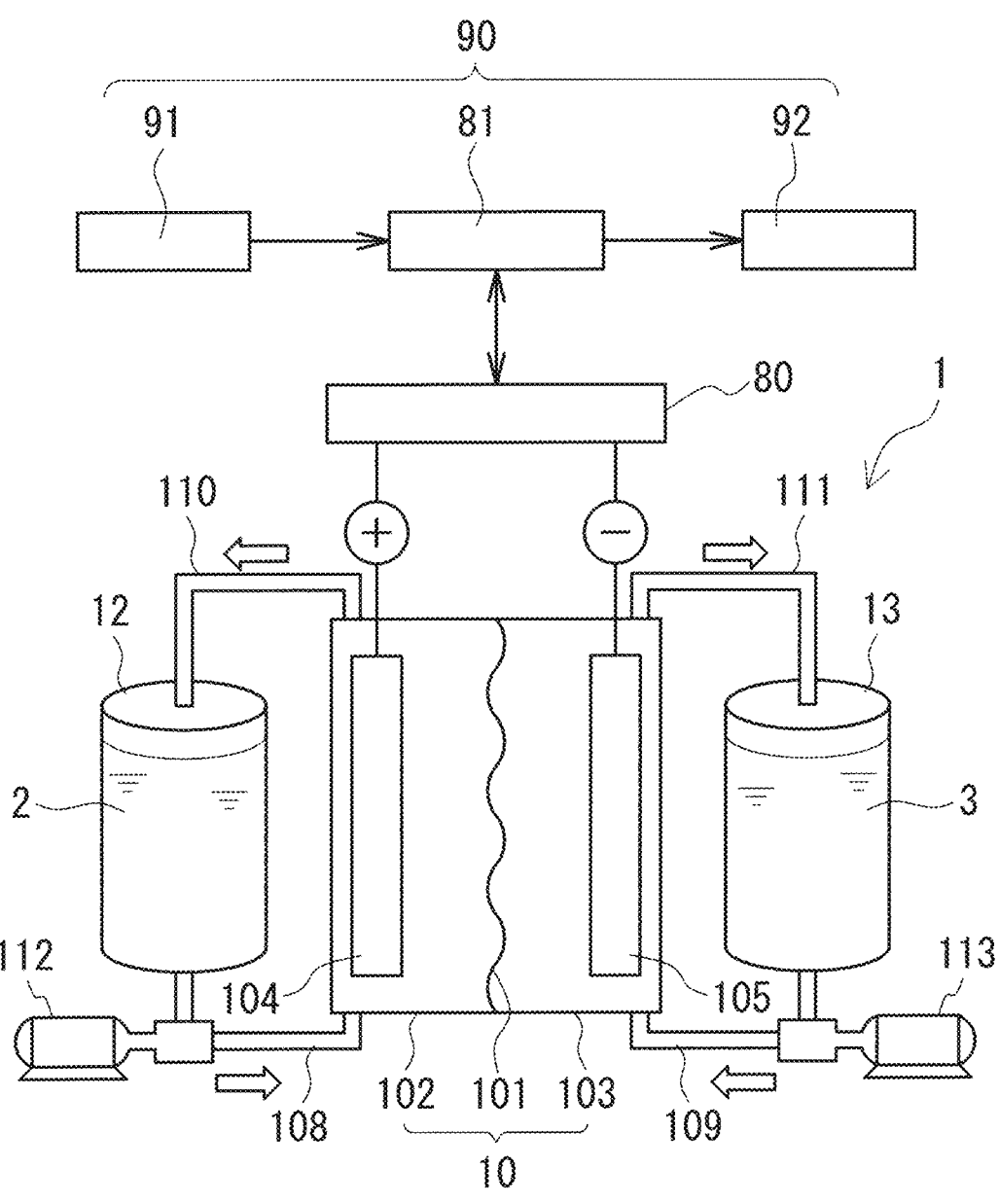
FIG. 1 is a schematic construction diagram showing a construction of a redox flow battery according to an embodiment.

Problem to be Solved by the Present Disclosure

Both of the inventions described in PTLs 1 and 2 aim to minimize lowering in battery capacity at the time when valence balance between a positive electrolyte and a negative electrolyte deviates from 3.5 during operation of a redox flow battery, by transferring the electrolyte to set a state back to an original state where valence does not deviate. Both of the inventions can be concluded as suppressing lowering in battery capacity due to change in valence balance between the electrolytes caused by electrolyte crossover or a side reaction resulting from repeated charging and discharging. In other words, the inventions in PTLs 1 and 2 can be concluded as aiming at recovery of a discharge capacity lowered from that in an initial state. Specifically, PTL 1 describes transfer of the negative electrolyte to a positive electrolyte tank when valence balance exceeds 3.5 and transfer of the positive electrolyte to a negative electrolyte tank when valence balance becomes lower than 3.5.

From a point of view of improvement in energy density in the redox flow battery, it is desired to increase the discharge capacity in the initial state and to maintain the discharge capacity high also over time.

One of objects of the present disclosure is to provide a redox flow battery high in energy density.

Advantageous Effect of the Present Disclosure

A redox flow battery in the present disclosure is high in energy density.

DESCRIPTION OF EMBODIMENTS OF THE PRESENT DISCLOSURE

The present inventors have conducted dedicated studies about improvement in energy density of a redox flow battery and obtained findings as below.

In a conventional redox flow battery, as a positive electrolyte tank where a positive electrolyte is stored and a negative electrolyte tank where a negative electrolyte is stored, tanks of the same design for suppression of cost and simplification of the entire system have been employed. In this case, the positive electrolyte tank and the negative electrolyte tank are substantially equal to each other in volume. For ease in adjustment of a liquid level of an electrolyte in each of the positive electrolyte tank and the negative electrolyte tank, in an initial state, a liquid amount of the positive electrolyte and a liquid amount of the negative electrolyte are adjusted to be equal to each other. Furthermore, the positive electrolyte and the negative electrolyte in the initial state are adjusted in advance such that a state of charge (SOC) of a mixture electrolyte obtained by mixing at a ratio equal to a ratio between the liquid amount of the positive electrolyte and the liquid amount of the negative electrolyte is set to zero (0).

For improving the energy density, for example, a concentration of an active material contained in each of the positive electrolyte and the negative electrolyte may be increased or a utilization factor of the electrolyte, that is, a utilization factor of the active material, may be increased. The utilization factor corresponds to an actually available discharge capacity. The utilization factor corresponds to a difference between a quantity of charged electricity at an upper limit SOC and a quantity of charged electricity at a lower limit SOC. In other words, the utilization factor represents a ratio of an active material used for charging and discharging to a concentration of the active material. The concentration of the active material contained in the electrolyte is restricted to a solubility of the electrolyte in a solvent. Since increase in concentration of the active material leads to increase in viscosity of the electrolyte, it leads to lowering in fluidity of the electrolyte, lowering in efficiency in operation of the battery, or increase in cost. Therefore, increase in concentration of the active material is limited. Expansion of a range of use of the SOC for enhancing the utilization factor gives rise to a problem as below.

Increase in upper limit SOC leads to increase in internal resistance and lowering in efficiency of an oxidation-reduction reaction. In a range where the SOC is high, a side reaction such as electrolysis of water contained in the electrolyte tends to occur. For example, oxygen may be generated at a positive electrode and hydrogen may be generated at a negative electrode. Furthermore, with increase in upper limit SOC, depending on a type or a concentration of the active material, the active material may be deposited. A deposit of the active material may not be used for charging and discharging or it may be difficult to use the deposit for charging and discharging because of a small surface area thereof. For such reasons, when the active material is deposited in the electrolyte, the deposit may not function as the active material. Therefore, deposit of the active material may lead to lowering in discharge capacity. When the lower limit SOC is lowered, on the other hand, the internal resistance increases and efficiency of the oxidation-reduction reaction lowers. Depending on the type or the concentration of the active material, the active material may be deposited. Therefore, the positive electrolyte and the negative electrolyte are generally used in a range of the SOC where lowering in efficiency of the oxidation-reduction reaction described above, the side reaction, or deposit of the active material is unlikely. In other words, in order to ensure reliability with deterioration in performance of the battery being suppressed, the range of use of the SOC is restricted.

Depending on a type of a positive electrode active material contained in the positive electrolyte and a type of a negative electrode active material contained in the negative electrolyte, optimal ranges of the SOC of the electrolytes may be different from each other. In the conventional redox flow battery, as described above, the liquid amount of the positive electrolyte is equal to the liquid amount of the negative electrolyte, and the SOC of the mixture electrolyte is substantially zero. Therefore, the range of use of the SOC of the positive electrolyte and the range of use of the SOC of the negative electrolyte cannot be set independently of each other. In other words, since the positive electrolyte and the negative electrolyte are used in the same range of use of the SOC, each electrolyte cannot be used in the optimal range of the SOC thereof. Specifically, when the range of use of the SOC is set in conformity with the optimal range of the SOC of one electrolyte, an actual range of use of the SOC of the other electrolyte is smaller or larger than the optimal range of the SOC. When the actual range of use of the SOC is smaller than the optimal range of the SOC, the utilization factor of the electrolyte, that is, the discharge capacity, is lowered and hence improvement in energy density cannot be achieved. When the actual range of use of the SOC is larger than the optimal range of the SOC, on the other hand, lowering in efficiency of the oxidation-reduction reaction, the side reaction, or deposit of the active material described above occurs.

In order to optimize the range of use of the SOC of each of the positive electrolyte and the negative electrolyte, the present inventors propose setting the liquid amount of the positive electrolyte and the liquid amount of the negative electrolyte differently from each other and to adjust the SOC of the mixture electrolyte to a value equal to or larger than a prescribed value which is not zero.

Embodiments of the present disclosure will initially be listed and described.

(1) A redox flow battery according to an embodiment of the present disclosure includes a positive electrolyte containing a positive electrode active material and a negative electrolyte containing a negative electrode active material, a liquid amount of the positive electrolyte is different from a liquid amount of the negative electrolyte, of the positive electrolyte and the negative electrolyte, a liquid amount ratio of the electrolyte larger in liquid amount to the electrolyte smaller in liquid amount is not lower than 1.05 and not higher than 5.0, and a state of charge of a mixture electrolyte which is a mixture of the positive electrolyte and the negative electrolyte at a ratio equal to the liquid amount ratio is equal to or higher than 2%.

In the redox flow battery in the present disclosure, the liquid amount of the positive electrolyte is different from the liquid amount of the negative electrolyte and the SOC of the mixture electrolyte is equal to or larger than the prescribed value which is not zero, and hence the range of use of the SOC of each electrolyte can be optimized. Accordingly, the redox flow battery in the present disclosure can achieve improvement in energy density. Therefore, the discharge capacity in the initial state can be increased. In other words, in the redox flow battery in the present disclosure, positively, the liquid amount of the positive electrolyte and the liquid amount of the negative electrolyte are set to be different from each other and the SOC of the mixture electrolyte is set to the prescribed value other than zero, so that the range of use of the SOC of each electrolyte can be wider than in the conventional example. By controlling the liquid amount ratio between the positive electrolyte and the negative electrolyte and controlling the SOC of the mixture electrolyte, increase in discharge capacity in the initial state can be maintained also over time. Definition of the SOC of the mixture electrolyte and the reason why the range of use of the SOC can be optimized will be described later.

(2) In one form of the redox flow battery, the state of charge of the mixture electrolyte may be equal to or lower than 20%.

The form can achieve a sufficiently enhanced energy density.

(3) In one form of the redox flow battery, the redox flow battery may include a positive electrolyte tank where the positive electrolyte is stored and a negative electrolyte tank where the negative electrolyte is stored, and of the positive electrolyte tank and the negative electrolyte tank, a ratio of a volume of the tank where the electrolyte larger in liquid amount is stored to a volume of the tank where the electrolyte smaller in liquid amount is stored may be not lower than 1.0 and not higher than 6.0.

The volume of the positive electrolyte tank and the volume of the negative electrolyte tank may be equal to or different from each other. When the tanks are equal to each other in volume, that is, a volume ratio between the positive electrolyte tank and the negative electrolyte tank is 1.0, cost for the tanks can be reduced and design can be simplified. When the tanks are different in volume from each other, electrolytes different in liquid amount can readily be stored in the tanks. Furthermore, when the volume ratio between the positive electrolyte tank and the negative electrolyte tank is different from the liquid amount ratio between the positive electrolyte and the negative electrolyte, a degree of freedom in design including design of tanks and pipes is high.

(4) In one form of the redox flow battery, the positive electrode active material and the negative electrode active material may be metallic ions composed of an identical element.

In the form, even when metallic ions move between the positive electrolyte and the negative electrolyte during operation of the redox flow battery, influence on battery performance is little.

(5) In one form of the redox flow battery described in (4), the metallic ions may include vanadium ions.

In the form, high electromotive force is obtained.

(6) In one form of the redox flow battery described in any one of (1) to (3), the positive electrode active material and the negative electrode active material may be metallic ions composed of elements different from each other.

In the form, an effect of improvement in energy density tends to significantly be obtained. In the form, an advantage obtained by optimization of the range of use of the SOC of each electrolyte is great.

(7) In one form of the redox flow battery described in (6), the positive electrode active material may be at least one type of metallic ions selected from the group consisting of iron ions, vanadium ions, and manganese ions, and the negative electrode active material may be at least one type of metallic ions selected from the group consisting of zinc ions, chromium ions, vanadium ions, and titanium ions.

The form can achieve a construction of a redox flow battery high in energy density.

(8) In one form of the redox flow battery described in (7), the positive electrode active material may include manganese ions and the negative electrode active material may include titanium ions.

In the form, high electromotive force is obtained.

(9) In one form of the redox flow battery described in (8), the positive electrolyte and the negative electrolyte may contain both of manganese ions and titanium ions.

In the form, high electromotive force is obtained. In the form, titanium ions can suppress deposit of manganese ions which are the positive electrode active material in the positive electrolyte.

(10) A redox flow battery according to an embodiment of the present disclosure includes a positive electrolyte containing a positive electrode active material and a negative electrolyte containing a negative electrode active material, a liquid amount of the positive electrolyte is different from a liquid amount of the negative electrolyte, of the positive electrolyte and the negative electrolyte, a liquid amount ratio of the electrolyte larger in liquid amount to the electrolyte smaller in liquid amount is not lower than 1.05 and not higher than 5.0, a state of charge of a mixture electrolyte which is a mixture of the positive electrolyte and the negative electrolyte at a ratio equal to the liquid amount ratio is not lower than 2% and not higher than 20%, the positive electrode active material is at least one type of metallic ions selected from the group consisting of iron ions, vanadium ions, and manganese ions, and the negative electrode active material is at least one type of metallic ions selected from the group consisting of zinc ions, chromium ions, vanadium ions, and titanium ions.

Since the redox flow battery includes the construction of the redox flow battery described in (1), (2), and (7) described above, it can achieve an enhanced energy density.

Details of Embodiments of the Present Disclosure

A specific example of a redox flow battery in the present disclosure will be described with reference to the drawings.

The redox flow battery may be called an "RF battery" below. The same or corresponding elements in the drawings have the same reference characters allotted.

The present invention is not limited by these illustrations but is defined by the terms of the claims, and is intended to include any modifications within the scope and meaning equivalent to the terms of the claims.

Overview of RF Battery

An RF battery 1 according to the embodiment will be described with reference to FIG. 1. RF battery 1 is charged and discharged with the use of a positive electrolyte 2 containing a positive electrode active material and a negative electrolyte 3 containing a negative electrode active material. The positive electrode active material and the negative electrode active material are representatively metallic ions varied in valence by oxidation and reduction.

RF battery 1 is representatively connected to a power system 90 with an alternating-current (AC)/direct-current (DC) converter 80 or a transformer facility 81 being interposed. RF battery 1 can be charged with electric power generated by a power generation unit 91, or electric power charged therein can be discharged to a load 92. Power generation unit 91 is a power generation facility that utilizes natural energy such as solar photovoltaic generation or wind power generation or other general power plants. RF battery 1 is used, for example, in a load leveling application, momentary compensation, an application as an emergency power supply, or an application for smoothening of output in natural energy power generation.

<Construction of RF Battery>

RF battery 1 includes a battery cell 10 that is charged and discharged, a positive electrolyte tank 12 where positive electrolyte 2 is stored, a negative electrolyte tank 13 where negative electrolyte 3 is stored, and circulation flow channels through which positive electrolyte 2 and negative electrolyte 3 are circulated. The circulation flow channels include a circulation flow channel for the positive electrolyte through which positive electrolyte 2 is circulated between positive electrolyte tank 12 and battery cell 10 and a circulation flow channel for the negative electrolyte through which negative electrolyte 3 is circulated between negative electrolyte tank 13 and battery cell 10. A known construction can be used as appropriate for a basic construction of RF battery 1.

(Battery Cell)

Battery cell 10 includes a positive electrode 104, a negative electrode 105, and a membrane 101 interposed between positive electrode 104 and negative electrode 105. Battery cell 10 is separated into a positive cell 102 and a negative cell 103 by membrane 101. Membrane 101 is, for example, an ion exchange membrane through which hydrogen ions pass. Positive electrode 104 is accommodated in positive cell 102. Negative electrode 105 is accommodated in negative cell 103.

Positive cell 102 is supplied with positive electrolyte 2. Negative cell 103 is supplied with negative electrolyte 3. In the present example, a supply pipe 108 and a return pipe 110 through which battery cell 10 and positive electrolyte tank 12 are connected to each other and a supply pipe 109 and a return pipe 111 through which battery cell 10 and negative electrolyte tank 13 are connected to each other are provided. Supply pipes 108 and 109 are provided with pumps 112 and 113, respectively. Positive electrolyte 2 is supplied from positive electrolyte tank 12 through supply pipe 108 to positive cell 102 by means of pump 112. Positive electrolyte 2 that has passed through positive cell 102 and is discharged from positive cell 102 returns to positive electrolyte tank 12 through return pipe 110. Negative electrolyte 3 is supplied from negative electrolyte tank 13 through supply pipe 109 to negative cell 103 by means of pump 113. Negative electrolyte 3 that has passed through negative cell 103 and is discharged from negative cell 103 returns to negative electrolyte tank 13 through return pipe 111. In other words, supply pipes 108 and 109 and return pipes 110 and 111 construct the circulation flow channels.

Figure 2:
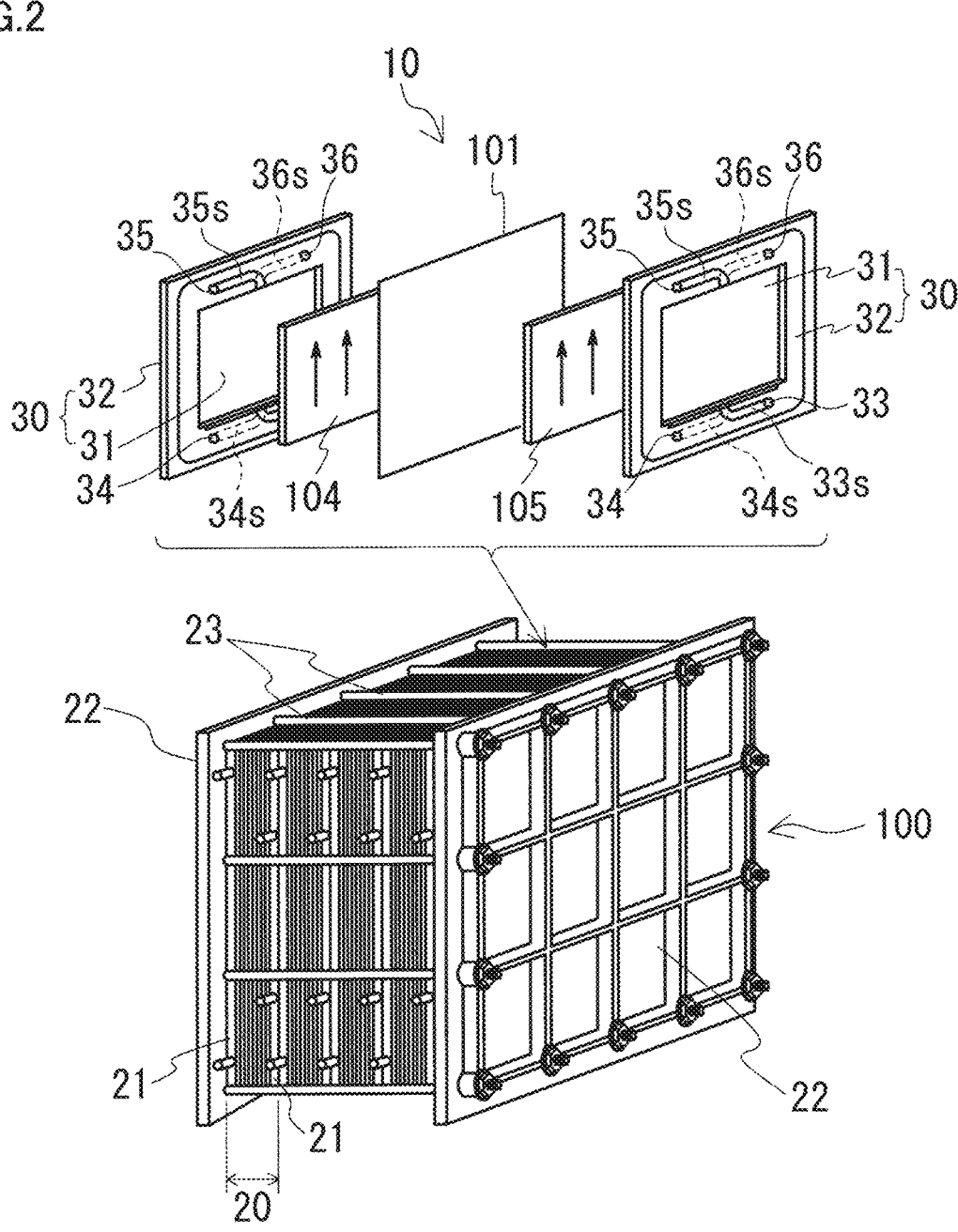
FIG. 2 is a schematic construction diagram showing an exemplary cell stack.

A form called a cell stack 100 in which a plurality of battery cells 10 are stacked as shown in FIG. 2 is normally used for RF battery 1. Cell stack 100 is constructed by sandwiching sub stacks 20 between two end plates 22 from opposing sides thereof and fastening end plates 22 on the opposing sides with a fastening mechanism 23. FIG. 2 shows cell stack 100 including a plurality of sub stacks 20. Sub stack 20 is in such a structure that a cell frame 30, positive electrode 104, membrane 101, and negative electrode 105 are repeatedly stacked in this order and a supply/drainage plate 21 is arranged at each of opposing ends of the stack. Supply pipes 108 and 109 and return pipes 110 and 111 shown in FIG. 1 that construct the circulation flow channels described above are connected to supply/drainage plates 21. The number of stacked battery cells 10 in cell stack 100 can be selected as appropriate.

As shown in FIG. 2, cell frame 30 includes a bipolar plate 31 and a frame body 32. Bipolar plate 31 is arranged between positive electrode 104 and negative electrode 105. Frame body 32 is provided around bipolar plate 31. On one surface side of bipolar plate 31, positive electrode 104 is arranged as being opposed thereto. On the other surface side of bipolar plate 31, negative electrode 105 is arranged as being opposed thereto. On an inner side of frame body 32, positive electrode 104 and negative electrode 105 are accommodated with bipolar plate 31 lying therebetween. As positive electrode 104 and negative electrode 105 are arranged between bipolar plates 31 of adjacent cell frames 30 with membrane 101 lying therebetween, one battery cell 10 is formed.

In frame body 32 of cell frame 30, liquid supply manifolds 33 and 34 and liquid discharge manifolds 35 and 36 and liquid feed slits 33$s$ and 34$s$ and liquid discharge slits 35$s$ and 36$s$ are provided. In the present example, the positive electrolyte is supplied from liquid supply manifold 33 through liquid feed slit 33$s$ to positive electrode 104. The positive electrolyte supplied to positive electrode 104 is discharged through liquid discharge slit 35$s$ to liquid discharge manifold 35. Similarly, the negative electrolyte is supplied from liquid supply manifold 34 through liquid feed slit 34$s$ to negative electrode 105. The negative electrolyte supplied to negative electrode 105 is discharged through liquid discharge slit 36$s$ to liquid discharge manifold 36. Liquid supply manifolds 33 and 34 and liquid discharge manifolds 35 and 36 are provided to pass through frame body 32, and as cell frames 30 are stacked, the manifolds define the flow channel for each electrolyte. The flow channel communicates with supply pipes 108 and 109 and return pipes 110 and 111 shown in FIG. 1 through supply/drainage plate 21. Cell stack 100 can allow a flow of the positive electrolyte and the negative electrolyte in battery cell 10 through respective flow channels.

One of characteristics of RF battery 1 in the embodiment is that the liquid amount of positive electrolyte 2 is different from the liquid amount of negative electrolyte 3 and the SOC of the mixture electrolyte which is the mixture of positive electrolyte 2 and negative electrolyte 3 at a ratio equal to the ratio between the liquid amount of positive electrolyte 2 and the liquid amount of negative electrolyte 3 is equal to or larger than a prescribed value which is not zero. Specifically, the liquid amount ratio between positive electrolyte 2 and negative electrolyte 3 is not lower than 1.05 and not higher than 5.0. The SOC of the mixture electrolyte is equal to or higher than 2%.

(Positive Electrolyte)

Positive electrolyte 2 contains a positive electrode active material. An exemplary positive electrode active material includes at least one type of metallic ions selected from the group consisting of iron (Fe) ions, vanadium (V) ions, and manganese (Mn) ions. In the case of V ions, they are mainly present in a state of tetravalent or pentavalent ions ($V^{4+}$/$V^{5+}$). In the case of Fe ions, they are mainly present in a state of divalent or trivalent ions ($Fe^{2+}$/$Fe^{3+}$). In the case of Mn ions, they are mainly present in a state of divalent or trivalent ions ($Mn^{2+}$/$Mn^{3+}$).

(Negative Electrolyte)

Negative electrolyte 3 contains a negative electrode active material. An exemplary negative electrode active material includes at least one type of metallic ions selected from the group consisting of zinc (Zn) ions, chromium (Cr) ions, V ions, and titanium (Ti) ions. In the case of V ions, they are mainly present in a state of divalent or trivalent ions ($V^{2+}$/$V^{3+}$). In the case of Cr ions, they are mainly present in a state of divalent or trivalent ions ($Cr^{2+}$/$Cr^{3+}$). In the case of Ti ions, they are mainly present in a state of trivalent or tetravalent ions ($Ti^{3+}$/$Ti^{4+}$). Tetravalent Ti ions ($Ti^{4+}$) include, for example, also a form of $TiO^{2+}$. In the case of Zn ions, they are mainly present as divalent ions ($Zn^{2+}$). Zn ions are present in a state of metallic zinc during charging.

Other than metallic ions, a non-metallic organic active material can also be employed as the positive electrode active material and the negative electrode active material. An exemplary organic active material includes a quinone compound such as 2,6-dihydroxyanthraquinone and radicals such as 2,2,6,6-tetramethylpiperidine 1-oxyl.

The positive electrode active material and the negative electrode active material may be metallic ions composed of an identical element or metallic ions composed of elements different from each other. When the positive electrode active material and the negative electrode active material are metallic ions of the same type, representatively, the positive electrode active material and the negative electrode active material may both include V ions. When the positive electrode active material and the negative electrode active material are metallic ions different in type from each other, representatively, the positive electrode active material may include Mn ions and the negative electrode active material may include Ti ions.

The positive electrode active material and the negative electrode active material can each be selected as appropriate from among metallic ions described above. A specific combination between the positive electrode active material and the negative electrode active material is shown below.

(1) Positive electrode active material: V ions ($V^{4+}$/$V^{5+}$), negative electrode active material: V ions ($V^{2+}$/$V^{3+}$)

(2) Positive electrode active material: Fe ions ($Fe^{2+}$/$Fe^{3+}$), negative electrode active material: Cr ions ($Cr^{2+}$/$Cr^{3+}$)

(3) Positive electrode active material: Mn ions ($Mn^{2+}$/$Mn^{3+}$), negative electrode active material: Ti ions ($Ti^{3+}$/$Ti^{4+}$)

(4) Positive electrode active material: Fe ions ($Fe^{2+}$/$Fe^{3+}$), negative electrode active material: Ti ions ($Ti^{3+}$/$Ti^{4+}$)

(5) Positive electrode active material: Mn ions ($Mn^{2+}$/$Mn^{3+}$), negative electrode active material: Zn ions ($Zn^{2+}$/Zn)

(6) Positive electrode active material: V ions ($V^{4+}$/$V^{5+}$), negative electrode active material: Zn ions ($Zn^{2+}$/Zn)

(7) Positive electrode active material: V ions ($V^{4+}$/$V^{5+}$), negative electrode active material: Ti ions ($Ti^{3+}$/$Ti^{4+}$)

(8) Positive electrode active material: V ions ($V^{4+}$/$V^{5+}$), negative electrode active material: Cr ions ($Cr^{2+}$/$Cr^{3+}$)

(9) Positive electrode active material: Mn ions ($Mn^{2+}$/$Mn^{3+}$), negative electrode active material: V ions ($V^{2+}$/$V^{3+}$)

(10) Positive electrode active material: Mn ions ($Mn^{2+}$/$Mn^{3+}$), negative electrode active material: Cr ions ($Cr^{2+}$/$Cr^{3+}$)

(11) Positive electrode active material: Fe ions ($Fe^{2+}$/$Fe^{3+}$), negative electrode active material: V ions ($V^{42+}$/$V^{53+}$)

(12) Positive electrode active material: Fe ions ($Fe^{2+}$/$Fe^{3+}$), negative electrode active material: Zn ions ($Zn^{2+}$/Zn)

The combination between the positive electrode active material and the negative electrode active material determines electromotive force. Among the combinations above, for example, such a form that both of the positive electrode active material and the negative electrode active material are V ions or such a form that the positive electrode active material is Mn ions and the negative electrode active material is Ti ions achieves high electromotive force.

Positive electrolyte 2 and negative electrolyte 3 may contain metallic ions of the same type. For example, the positive electrode active material and the negative electrode active material may be metallic ions of the same element and at least one type of metallic ions contained in positive electrolyte 2 and negative electrolyte 3 may be of the same type. In particular, all metallic ions contained in positive electrolyte 2 and negative electrolyte 3 may be of the same type. In RF battery 1, due to repeated charging and discharging over a long period, metallic ions contained in positive electrolyte 2 and negative electrolyte 3 may permeate through membrane 101 of battery cell 10 and move between positive electrolyte 2 and negative electrolyte 3, or electrolyte crossover in which one electrolyte passes through membrane 101 and moves to the other electrolyte may occur. As positive electrolyte 2 and negative electrolyte 3 contain metallic ions of the same type, battery performance tends to be maintained even when metallic ions move between positive electrolyte 2 and negative electrolyte 3 or electrolyte crossover occurs due to repeated charging and discharging. When the positive electrode active material and the negative electrode active material are metallic ions of the same element, metallic ions can function as the active material in both of the electrolytes. In an example where positive electrolyte 2 and negative electrolyte 3 contain metallic ions of the same type, even when positive electrolyte 2 and negative electrolyte 3 are mixed with each other, the type of metallic ions contained in each of positive electrolyte 2 and negative electrolyte 3 does not change. Positive electrolyte 2 and negative electrolyte 3 can readily be mixed with each other for correcting electrolyte crossover.

In such a form that the positive electrode active material is Mn ions and the negative electrode active material is Ti ions, for example, positive electrolyte 2 and negative electrolyte 3 may contain both of Mn ions and Ti ions. In this case, in positive electrolyte 2, Mn ions function as the positive electrode active material. In negative electrolyte 3, Ti ions function as the negative electrode active material. When Mn ions are employed as the positive electrode active material, Mn ions may be deposited as an Mn oxide in positive electrolyte 2. This is because trivalent Mn ions ($Mn^{3+}$) are unstable and $Mn^{3+}$ tends to be deposited as an Mn oxide such as $MnO_2$ during charging. When positive electrolyte 2 contains Ti ions, Ti ions can suppress deposit of Mn ions. Ti ions contained in positive electrolyte 2 and Mn ions contained in negative electrolyte 3 do not function as the active material. Mn ions contained in negative electrolyte 3 mainly serve for identicalness of metallic ion species in both of the electrolytes.

An aqueous solution can suitably be used as a solvent of positive electrolyte 2 and a solvent of negative electrolyte 3. An exemplary solvent includes a sulfuric acid ($H_2SO_4$) aqueous solution, a phosphoric acid ($H_3PO_4$) aqueous solution, and nitric acid ($HNO_3$) solution. In particular, the sulfuric acid aqueous solution is readily available.

A concentration of the positive electrode active material contained in positive electrolyte 2 and a concentration of the negative electrode active material contained in negative electrolyte 3 may be, for example, not lower than 0.3 M and not higher than 5 M. "M" means molarity (mol/L). "L" means liter. 1 L is equal to $10^{-3}$ $m^3$. As the concentration of the active material is equal to or higher than 0.3 M in positive electrolyte 2 and negative electrolyte 3, the energy density is readily enhanced. Since the energy density can be higher as the concentration of the active material is higher, the concentration of the active material is preferably equal to or higher than 0.5 M or furthermore equal to or higher 1.0 M. In consideration of the solubility in the solvent, the concentration of the active material may be equal to or lower than 5 M or furthermore equal to or lower than 2 M. When positive electrolyte 2 and negative electrolyte 3 contain both of Mn ions and Ti ions, the concentration of Ti ions contained in positive electrolyte 2 and the concentration of Mn ions contained in negative electrolyte 3 may be, for example, not lower than 0.3 M and not higher than 5 M or furthermore not lower than 0.5 M and not higher than 2 M.

The concentration of the positive electrode active material contained in positive electrolyte 2 and the concentration of the negative electrode active material contained in negative electrolyte 3 may be equal to or different from each other. When the positive electrode active material and the negative electrode active material are metallic ions of the same type, the concentrations of the active material therein are readily adjusted to be equal. When the positive electrode active material and the negative electrode active material are metallic ions different in type from each other, the solubility is different depending on the type of metallic ions and hence the concentrations of the active materials may be adjusted to be different from each other.

(Liquid Amount Ratio Between Positive Electrolyte and Negative Electrolyte)

The liquid amount ratio between positive electrolyte 2 and negative electrolyte 3 is not lower than 1.05 and not higher than 5.0. The liquid amount ratio refers to a ratio of the liquid amount of the electrolyte larger in liquid amount to the electrolyte smaller in liquid amount, of positive electrolyte 2 and negative electrolyte 3. The liquid amount of positive electrolyte 2 refers to a volume of positive electrolyte 2. The liquid amount of negative electrolyte 3 refers to a volume of negative electrolyte 3. The liquid amount ratio may be set based on the concentration of the positive electrode active material and the concentration of the negative electrode active material and the optimal range of the SOC of each electrolyte. As the liquid amount ratio is equal to or higher than 1.05, the effect of improvement in energy density is readily obtained. As the liquid amount ratio is equal to or lower than 5.0, an excessively large liquid amount of the electrolyte larger in liquid amount can be suppressed. Consequently, the tank where the electrolyte larger in liquid amount is stored is not excessively large. The liquid amount ratio may be, for example, not lower than 1.1 and not higher than 4.0 or furthermore not lower than 1.2 and not higher than 3.0 or not lower than 1.3 and not higher than 2.5.

(Volume Ratio Between Positive Electrolyte Tank and Negative Electrolyte Tank)

A volume ratio between positive electrolyte tank 12 and negative electrolyte tank 13 may be not lower than 1.0 and not higher than 6.0. The volume ratio refers to a ratio of the volume of the tank where the electrolyte larger in liquid amount is stored to the volume of the tank where the electrolyte smaller in liquid amount is stored, of positive electrolyte tank 12 and negative electrolyte tank 13. The volume of positive electrolyte tank 12 and the volume of negative electrolyte tank 13 should only be set in accordance with the liquid amount of positive electrolyte 2 and the liquid amount of negative electrolyte 3. The volume of positive electrolyte tank 12 and the volume of negative electrolyte tank 13 may be equal to or different from each other. The volume ratio may be set based on the liquid amount ratio described above. As the volume ratio is not lower than 1.0 and not higher than 6.0, the volumes of positive electrolyte tank 12 and negative electrolyte tank 13 are readily set to magnitude in accordance with the respective liquid amounts of positive electrolyte 2 and negative electrolyte 3.

The volume ratio may be equal to or different from the liquid amount ratio. Even when the liquid amount ratio is equal to or higher than 1.05, in consideration also of a volume of a vapor phase portion above the liquid level of positive electrolyte 2 within positive electrolyte tank 12 and a volume of a vapor phase portion above the liquid level of negative electrolyte 3 within negative electrolyte tank 13, the volume ratio does not necessarily have to be equal to or higher than 1.05 in conformity with the liquid amount ratio. When the liquid amount ratio is sufficiently low, the volume ratio may be set to 1.0 for cost for manufacturing the tank or simplification of design. In other words, the volume of positive electrolyte tank 12 and the volume of negative electrolyte tank 13 are permitted to be equal to each other. The liquid amount ratio being sufficiently low refers, for example, to an example in which the liquid amount ratio is lower than 1.5. The vapor phase portion within each tank may have a margin to some extent for such reasons in terms of design as arrangement of an end of each pipe such as supply pipes 108 and 109 and return pipes 110 and 111. Therefore, even when the liquid amount ratio is set to 5.0, the volume ratio may desirably be designed to approximately 6.0.

The volume ratio may be, for example, not lower than 1.05 and not higher than 5.0, or furthermore not lower than 1.1 and not higher than 4.0, not lower than 1.2 and not higher than 3.0, or not lower than 1.3 and not higher than 2.5, in conformity with the liquid amount ratio. The volume ratio can be set in accordance with the volume of the vapor phase portion within positive electrolyte tank 12 and the volume of the vapor phase portion within negative electrolyte tank 13 and other design conditions.

In addition, not only the volume of positive electrolyte tank 12 and the volume of negative electrolyte tank 13 but also a volume of a pipe connected to each of positive electrolyte tank 12 and negative electrolyte tank 13 may be different. For adjustment of the liquid level of the electrolyte within positive electrolyte tank 12 and adjustment of the liquid level of the electrolyte within negative electrolyte tank 13, an object having an appropriate volume may be sunk in at least one tank. Positive electrolyte 2 is stored not only in positive electrolyte tank 12 but also in each pipe. Negative electrolyte 3 is stored not only in negative electrolyte tank 13 but also in each pipe. Therefore, the liquid amount of positive electrolyte 2 that can be stored is determined by the sum of the volume of positive electrolyte tank 12 and the volume of the pipe. The liquid amount of negative electrolyte 3 that can be stored is determined by the sum of the volume of negative electrolyte tank 13 and the volume of the pipe. Therefore, by not only setting the volume ratio between positive electrolyte tank 12 and negative electrolyte tank 13 in conformity with the liquid amount ratio but also adjusting the volume of each pipe, positive electrolyte 2 and negative electrolyte 3 at a prescribed liquid amount ratio can be stored. For example, by changing a length of each pipe or sinking an object in at least one tank, the volume ratio can variously be selected regardless of the liquid amount ratio.

(SOC of Mixture Electrolyte)

The SOC of the mixture electrolyte which is the mixture of positive electrolyte 2 and negative electrolyte 3 at a ratio equal to the liquid amount ratio is equal to or higher than 2%. The SOC of the mixture electrolyte may be set based on the concentration of the positive electrode active material and the concentration of the negative electrode active material, the optimal range of the SOC of each electrolyte, and the liquid amount ratio described above. As the SOC of the mixture electrolyte is equal to or higher than 2%, the effect of improvement in energy density can be enhanced. Though the SOC of the mixture electrolyte may be set as appropriate, a practical range thereof is equal to or lower than 20%. The SOC of the mixture electrolyte may be, for example, not lower than 2% and not higher than 20% or furthermore not lower than 3% and not higher than 10%.

Definition of SOC of Mixture Electrolyte

The SOC of the mixture electrolyte is defined as below in accordance with a state of mixing of positive electrolyte 2 and negative electrolyte 3 at a ratio equal to the liquid amount ratio.

Initially, an example in which an oxidation-reduction reaction of an active material falls under a one-electron reaction is considered. For the positive electrode active material, a concentration of a reductant is denoted as $Cpr$, a concentration of an oxidant is denoted as $Cpo$, and a total concentration is denoted as $Cp$. Total concentration $Cp$ of the positive electrode active material is expressed as $Cp=Cpr+Cpo$. Similarly also for the negative electrode active material, a concentration of a reductant is denoted as $Cnr$, a concentration of an oxidant is denoted as $Cno$, and a total concentration is denoted as $Cn$. Total concentration $Cn$ of the negative electrode active material is expressed as $Cn=Cnr+Cno$. A ratio between the concentration of the oxidant and the concentration of the reductant is defined for the positive electrode active material or the negative electrode active material based on the SOC of the RF battery. It is assumed that the positive electrolyte and the negative electrolyte are mixed at a certain specific SOC in the RF battery. A mixture electrolyte which is a mixture of the positive electrolyte and the negative electrolyte at a ratio equal to the ratio between the positive electrolyte and the negative electrolyte when a liquid amount vp (L) of the positive electrolyte and a liquid amount vn (L) of the negative electrolyte are different from each other, that is, a condition of vp≠vn is satisfied, in the RF battery is considered. In other words, the mixture electrolyte is the mixture of the positive electrolyte and the negative electrolyte at vp:vn.

With an example in which concentration Cpo (mol/L) of the oxidant in the positive electrode active material and concentration Cnr (mol/L) of the reductant in the negative electrode active material are zero, that is, Cpo=Cnr=0, being defined as the reference, a quantity of electricity oxidized or reduced in the mixture electrolyte corresponds to (Cpo·vp−Cnr·vn)/(vp+vn)×F[C]. Reference F represents a Faraday constant, with F being defined as F=96485 [C/mol].

With m being defined as m=(Cpo·vp−Cnr·vn)/(vp+vn) [mol/L], reference m in this expression corresponds to the concentration of the active material that carries a quantity of electricity that is oxidized or reduced.

When a condition of m>0 is satisfied, the SOC of the mixture electrolyte is defined as (m/Cp)×100 [%].

When a condition of m<0 is satisfied, the SOC of the mixture electrolyte is defined as (m/Cn)×100 [%].

An example in which the active material undergoes a reaction of two or more electrons and the active material that has undergone a one-electron reaction and the active material that has undergone the reaction of two or more electrons coexist as well, similar definition can be applied. It is assumed that the positive electrode active material is produced until an Np-electron reaction and the negative electrode active material is produced until an Nn-electron reaction. Reference Np and reference Nn each represent a natural number not smaller than 2. At this time, total concentration Cp of the positive electrode active material and total concentration Cn of the negative electrode active material are expressed as below.

$$Cp=Cpr+\Sigma CpO_i(i=1,2,\ldots,Np)$$

$$Cn=\Sigma Cnr_i+Cno(i=1,2,\ldots,Nn)$$

Therefore, a condition of m={vpΣ(Cpo$_i$×i)−vnΣ(Cnr$_i$×i)}/(vp+vn) is satisfied.

Example 1

In Example 1, an example in which an electrolyte containing 1 mol/L of Ti ions and 1 mol/L of Mn ions is employed as the positive electrolyte and the negative electrolyte will be described by way of example. In the RF battery including these electrolytes, Mn$^{2+}$ which is the reductant and Mn$^{3+}$ which is the oxidant are present as the positive electrode active materials and Ti$^{4+}$ which is the oxidant and Ti$^{3+}$ which is the reductant are present as the negative electrode active materials. The RF battery is assumed to operate in a state of Cpo=0.42 (mol/L), Cpr=0.58 (mol/L), Cnr=0.40 (mol/L), Cno=0.60 (mol/L), vp=1.05 (L), and vn=1.00 (L).

In this case, m is calculated as m=(Cpo·vp−Cnr·vn)/(vp+vn)=(0.42×1.05−0.40×1.00)/(1.05+1.00)=0.02. In other words, the mixture electrolyte which is the mixture of the positive electrolyte and the negative electrolyte in accordance with the ratio between the liquid amount of the positive electrolyte and the liquid amount of the negative electrolyte has been charged with charges corresponding to 0.02 mol/L as Mn$^{3+}$. The SOC of the mixture electrolyte is calculated as 0.02/Cp=0.02/(0.42+0.58)=2%.

Example 2

In Example 2, it is assumed that MnO$_2$ which is the oxidant that undergoes a two-electron reaction is also further present as the positive electrode active material in the positive electrolyte in the RF battery including the electrolytes the same as in Example 1. This RF battery is assumed to operate in a state of Cpo$_1$=0.22 (mol/L), Cpo$_2$=0.10 (mol/L), Cpr=0.68 (mol/L), Cnr=0.40 (mol/L), Cno=0.60 (mol/L), vp=1.05 (L), and vn=1.00 (L). Cpo$_1$ corresponds to the concentration of Mn$^{3+}$. Cpo$_2$ corresponds to the concentration of MnO$_2$.

In this case, m is calculated as m={vpΣ(Cpo$_i$×i)−(Cnr·vn)}/(vp+vn)={1.05×(0.22+(0.10×2))−0.40×1.00}/(1.05+1.00)=0.02. In other words, the mixture electrolyte is charged with charges corresponding to 0.02 mol/L as Mn$^{3+}$. The SOC of the mixture electrolyte is calculated as 0.02/Cp=0.02/(0.22+0.10+0.68)=2%.

Example 3

In Example 3, an example in which an electrolyte containing 1 mol/L of V ions alone as the active material is employed as the positive electrolyte and the negative electrolyte will be described by way of example. In the RF battery including these electrolytes, V$^{3+}$ as the reductant and V$^{4+}$ as the oxidant are present as the positive electrode active materials and V$^{4+}$ as the oxidant and V$^{3+}$ as the reductant are present as the negative electrode active materials. In the RF battery, conventionally, V$^{4+}$ as the reductant and V$^{5+}$ as the oxidant may be handled as the positive electrode active materials, and V$^{3+}$ as the oxidant and V$^{2+}$ as the reductant may be handled as the negative electrode active materials. Attention, however, is paid to the state of the mixture electrolyte, and hence the SOC in the initial state of the RF battery should be considered. Therefore, it is reasonable to consider that, as in the former case, V$^{3+}$ as the reductant and V$^{4+}$ as the oxidant are present as the positive electrode active materials and V$^{4+}$ as the oxidant and V$^{3+}$ as the reductant are present as the negative electrode active materials. This RF battery is assumed to operate in a state of Cpo=0.51 (mol/L), Cpr=0.49 (mol/L), Cnr=0.49 (mol/L), Cno=0.51 (mol/L), vp=1.05 (L), and vn=1.00 (L).

In this case, m is calculated as m=(Cpo·vp−Cnr·vn)/(vp+vn)=(0.51×1.05−0.49×1.00)/(1.05+1.00)=0.022. The SOC of the mixture electrolyte is calculated as 0.022/Cp=0.022/(0.51+0.49)=2.2%. When a condition of vp=vn=1 is satisfied, the SOC of the mixture electrolyte is 1%. The mixture electrolyte at this time contains 0.49 M of V$^{3+}$ and 0.51 M of V$^{4+}$. In this case, conventionally, denotation "valence of 3.51 as average valence" may be given.

The SOC of the mixture electrolyte corresponds to imbalance between valence of positive electrolyte 2 and valence of negative electrolyte 3. The SOC of the mixture electrolyte being at a certain level or higher means that the positive electrode active material in an oxidized state or the negative electrode active material in a reduced state is present at a certain ratio or higher with positive electrolyte 2 and negative electrolyte 3 having been mixed with each other.

The SOC of the mixture electrolyte is calculated as the SOC of the electrolyte as a whole at the time when positive electrolyte 2 and negative electrolyte 3 are mixed with each other. The SOC here is expressed on the premise that the positive electrode active material or the negative electrode active material undergoes a one-electron reaction. For example, in an example in which the positive electrode active material is contained in positive electrolyte 2 at the concentration of 1 mol/L, the positive electrode active material in the oxidized state is assumed to be present at the time of mixing of positive electrolyte 2 and negative electrolyte 3 with each other. When there is a quantity of electricity corresponding to 0.02 mol/L with positive electrolyte 2 and negative electrolyte 3 having been mixed with each other, definition the "SOC of the mixture electrolyte being 2%" is given. The "SOC of the mixture electrolyte being 2%" in this case means a state that the positive electrode active material is oxidized by an amount corresponding to 96485 (C/mol)×0.02 (mol/L)=1929.7 (C/L), with the Faraday constant being defined as 96485 (C/mol). Furthermore, in a state that there is a quantity of electricity corresponding to 0.2 mol/L, definition the "SOC of the mixture electrolyte being 20%" is given. The "SOC of the mixture electrolyte being 20%" in this case means a state that the positive electrode active material is oxidized by an amount corresponding to 96485 (C/mol)×0.2 (mol/L)=19297 (C/L). In an example in which negative electrolyte 3 contains the negative electrode active material at the concentration of 1 mol/L, the negative electrode active material in the reduced state is assumed to be present at the time of mixing of positive electrolyte 2 and negative electrolyte 3 with each other. In a state that there is a quantity of electricity corresponding to 0.02 mol/L with positive electrolyte 2 and negative electrolyte 3 having been mixed with each other as well, similarly, definition the "SOC of the mixture electrolyte being 2%" is given. The "SOC of the mixture electrolyte being 2%" in this case means a state that the negative electrode active material is reduced by an amount corresponding to 96485 (C/mol)×0.02 (mol/L)=1929.7 (C/L). Furthermore, in a state that there is a quantity of electricity corresponding to 0.2 mol/L as well, definition the "SOC of the mixture electrolyte being 20%" is given. The "SOC of the mixture electrolyte being 20%" in this case means a state that the negative electrode active material is reduced by an amount corresponding to 96485 (C/mol)×0.2 (mol/L)=19297 (C/L).

An exemplary method of adjusting the SOC of the mixture electrolyte at the time of mixing of positive electrolyte 2 and negative electrolyte 3 with each other may include oxidizing or reducing the active material with the concentration of the active material in any of positive electrolyte 2 and negative electrolyte 3 being defined as the reference. In adjustment of the SOC of the mixture electrolyte, in preparation of positive electrolyte 2 and negative electrolyte 3, the SOC of each electrolyte, that is, valence of the active material in the electrolyte, may be adjusted. After preparation of the electrolyte, the positive electrode active material in positive electrolyte 2 may be oxidized or the negative electrode active material in negative electrolyte 3 may be reduced. An exemplary method of oxidation of the positive electrode active material may include natural oxidation by air and chemical oxidation by an oxidizing agent. For example, oxygenated water or the like can be employed as the oxidizing agent. An exemplary method of reduction of the negative electrode active material may include chemical reduction with a reducing agent. For example, hydrogen, sulfurous acid, or oxalic acid can be employed as the reducing agent. In addition, positive electrolyte 2 and negative electrolyte 3 can be charged to a prescribed SOC, the positive electrode active material can be oxidized and the negative electrode active material can be reduced, and thereafter, one electrolyte the SOC of which has been adjusted can be maintained but the other electrolyte can be replaced with an electrolyte at a different SOC, to thereby adjust valence of positive electrolyte 2 and valence of negative electrolyte 3 to be different from each other. Namely, the SOC of the mixture electrolyte can be adjusted.

<Optimization of Range of Use of SOC and Relation Between Liquid Amount Ratio and SOC of Mixture Electrolyte>

In RF battery 1 in the embodiment, as described above, positive electrolyte 2 and negative electrolyte 3 are different from each other in liquid amount and also in valence, and hence the range of use of the SOC of positive electrolyte 2 and the range of use of the SOC of negative electrolyte 3 can both be optimized. The range of use of the SOC refers to a range of the SOC that is actually used in charging and discharging. The reason why the range of use of the SOC can be optimized will be described below.

The optimal range of the SOC of each of the positive electrolyte and the negative electrolyte is determined mainly by the type of metallic ions serving as each of the positive electrode active material and the negative electrode active material. The optimal range of the SOC of each electrolyte may also be varied by the concentration of the active material or the concentration of the solvent. When it is assumed that there is no influence by movement of metallic ions or electrolyte crossover between the electrolytes, the optimal range of the SOC of each electrolyte is not varied by a combination between the positive electrode active material and the negative electrode active material. A value of the SOC at which such a disadvantage as increase in internal resistance, a side reaction, or deposit of the active material does not occur in a late stage of charging is set as the upper limit of the optimal range of the SOC of each electrolyte. A value of the SOC at which such a disadvantage as increase in internal resistance or deposit of the active material does not occur in a late stage of discharging is set as the lower limit of the optimal range of the SOC of each electrolyte. Initially, a case in which the liquid amount of the positive electrolyte is equal to the liquid amount of the negative electrolyte and the SOC at the time of mixing of the electrolytes is 0% is considered. The SOC at the time of mixing of the electrolytes being 0% means that valence of the positive electrolyte and valence of the negative electrolyte are not different from each other, that is, the SOC of the mixture electrolyte is 0%. For example, the optimal range of the SOC of the positive electrolyte is assumed as being ½ the optimal range of the SOC of the negative electrolyte. In this case, when charging and discharging is carried out in conformity with the optimal range of the SOC of the positive electrolyte, the actual range of use of the SOC of the negative electrolyte is restricted by the range of the SOC of the positive electrolyte. In this example, the actual range of use of the SOC of the negative electrolyte is restricted to ½ the optimal range of the SOC at the maximum. Therefore, the range of use of the SOC of the negative electrolyte is smaller. Since the range of use of the SOC of the negative electrolyte is restricted by the positive electrolyte, improvement in energy density cannot be achieved. In contrast, when charging and discharging is carried out such that the actual range of use of the SOC of the negative electrolyte is set to the optimal range of the SOC, the actual range of use of the SOC of the positive electrolyte is twice as large as the optimal range of the SOC. In other words, at least one of the SOC in the late stage of charging and the SOC in the late stage of discharging of the positive electrolyte is out of the optimal range of the SOC. When the SOC in the late stage of charging of the positive electrolyte is higher than the optimal range of the SOC, a side reaction may occur or the positive electrode active material may be deposited. A deposit of the positive electrode active material may not be usable in charging and discharging, or it may be difficult to use the deposit in charging and discharging. When the SOC in the late stage of discharging of the positive electrolyte is lower than the optimal range of the SOC, the internal resistance increases and reaction efficiency lowers.

In the example described above, a state that only the liquid amount of the positive electrolyte is increased while the SOC of the mixture electrolyte at the time of mixing of the positive electrolyte and the negative electrolyte remains at 0% is considered. For example, a ratio between the liquid amount of the positive electrolyte and the liquid amount of the negative electrolyte is assumed as 2:1 and the liquid amount ratio between the positive electrolyte and the negative electrolyte is assumed as 2. When the liquid amount of the positive electrolyte is doubled in the example where the optimal range of the SOC of the positive electrolyte is ½ the optimal range of the SOC of the negative electrolyte, charging and discharging by a quantity of electricity corresponding to the optimal range of the SOC can be done in each of the positive electrolyte and the negative electrolyte. Therefore, the energy density can be enhanced. Simply by adjusting only the liquid amount ratio, however, it is unclear whether or not the actual range of use of the SOC is the optimal range of the SOC of both of the positive electrolyte and the negative electrolyte. The range of use of the SOC of the positive electrolyte or the negative electrolyte may be out of the optimal range of the SOC. Therefore, in a region where the range of use of the SOC is higher than the optimal range of the SOC of one or both of the positive electrolyte and the negative electrolyte, a side reaction or deposit of the active material occurs. In a region where the range of use of the SOC is lower than the optimal range of the SOC, on the other hand, the internal resistance increases and reaction efficiency lowers.

In the example described above, by increasing the liquid amount of the positive electrolyte and adjusting valences of the positive electrolyte and the negative electrolyte, the range of use of the SOC of each electrolyte can be adjusted to the optimal range of the SOC. For example, when the SOC in the late stage of discharging of the positive electrolyte is lower than the optimal range of the SOC, some positive electrode active material in the positive electrolyte is oxidized in advance to adjust valence such that the oxidized positive electrode active material is present in the positive electrolyte and the negative electrolyte as being mixed. As valence is thus adjusted such that the oxidized positive electrode active material is present, the SOC in the late stage of discharging of the positive electrolyte can be brought closer to the optimal range of the SOC. Therefore, such a disadvantage as lowering in reaction efficiency can be overcome. When the SOC in the late stage of charging of the positive electrolyte is higher than the optimal range of the SOC, some negative electrode active material in the negative electrolyte is reduced in advance to adjust valence such that the reduced negative electrode active material is present in the positive electrolyte and the negative electrolyte as being mixed. As valence is thus adjusted such that the reduced negative electrode active material is present, the SOC in the late stage of charging of the positive electrolyte can be brought closer to the optimal range of the SOC. Therefore, the effect of improvement in energy density is further enhanced by adjusting the liquid amount ratio between the positive electrolyte and the negative electrolyte and the SOC of the mixture electrolyte.

In the description above, an example in which the optimal range of the SOC of the positive electrolyte is smaller than the optimal range of the SOC of the negative electrolyte is described. An example in which the optimal range of the SOC of the negative electrolyte is smaller than the optimal range of the SOC of the positive electrolyte can also similarly be considered. Specifically, the energy density can be improved by increasing the liquid amount of the negative electrolyte and adjusting valences of the positive electrolyte and the negative electrolyte.

Functions and Effects

In RF battery 1 in the embodiment described above, for example, in the initial state, positive electrolyte 2 and negative electrolyte 3 are different from each other in liquid amount and valence, so that the range of use of the SOC of positive electrolyte 2 and the range of use of the SOC of negative electrolyte 3 can each be optimized. Therefore, the energy density can be improved and the RF battery high in energy density can be obtained. In particular, the liquid amount ratio between positive electrolyte 2 and negative electrolyte 3 is not lower than 1.05 and not higher than 5.0 and the SOC of the mixture electrolyte is equal to or higher than 2%, so that the effect of improvement in energy density is further enhanced. The initial state includes, for example, a state before start of operation of RF battery 1.

As described above, the optimal range of the SOC of positive electrolyte 2 and the optimal range of the SOC of negative electrolyte 3 may be different from each other. The conventional RF battery is configured such that, in the initial state, the liquid amount of positive electrolyte 2 and the liquid amount of negative electrolyte 3 are equal to each other and the valence of positive electrolyte 2 is not different from the valence of negative electrolyte 3. Therefore, the range of use of the SOC of positive electrolyte 2 and the range of use of the SOC of negative electrolyte 3 are both restricted to an overlapping range in the optimal ranges of the SOC. In other words, the conventional RF battery cannot be used in the optimal range of the SOC of each of positive electrolyte 2 and negative electrolyte 3. For example, when the range of use of the SOC is set in accordance with the optimal range of the SOC of one electrolyte, the range of use of the SOC of the other electrolyte is smaller or larger than the optimal range of the SOC thereof. In contrast, in RF battery 1 in the embodiment, the liquid amount ratio and the SOC of the mixture electrolyte can be controlled to bring the range of use of the SOC of positive electrolyte 2 and the range of use of the SOC of negative electrolyte 3 closer to the optimal range of the SOC of each of them or to have each of them agree with the optimal range of the SOC.

When the positive electrode active material and the negative electrode active material are metallic ions composed of elements different from each other, the optimal range of use of the SOC of positive electrolyte 2 is highly likely to be different from the optimal range of use of the SOC of negative electrolyte 3. The solubility of metallic ions in positive electrolyte 2 and the solubility of metallic ions in negative electrolyte 3 are different depending on the type of metallic ions. The concentration of the active material contained in positive electrolyte 2 and the concentration of the active material contained in negative electrolyte 3 are adjusted to be different from each other owing to the difference in solubility. Therefore, in such a form that the positive electrode active material and the negative electrode active material are metallic ions different in type from each other, an advantage obtained by optimization of both of the range of use of the SOC of positive electrolyte 2 and the range of use of the SOC of negative electrolyte 3 seems to be great.

Trial Calculation Example 1

The concentration of the positive electrode active material is set to 1.0 mol/L and the concentration of the negative electrode active material is set to 1.0 mol/L. The lower limit and the upper limit of the optimal range of the SOC of the positive electrolyte are set to 20% and 80%, respectively. The lower limit and the upper limit of the optimal range of the SOC of the negative electrolyte are set to 17% and 80%, respectively. In other words, the range of use of the SOC of the positive electrolyte is restricted to at least 20% and at most 80% and the range of use of the SOC of the negative electrolyte is restricted to at least 17% and at most 80%. The SOC is calculated on the assumption that each active material undergoes a one-electron reaction. A discharge capacity under this condition was calculated. The discharge capacity was calculated for each case below. Table 1 shows the discharge capacity in each case.
- (a) An example where the positive electrolyte and the negative electrolyte are equal to each other in liquid amount and the SOC of the mixture electrolyte is zero
- (b) An example where the liquid amount ratio between the positive electrolyte and the negative electrolyte is 1.05 and the SOC of the mixture electrolyte is zero
- (c) An example where the positive electrolyte and the negative electrolyte are equal to each other in liquid amount and the SOC of the mixture electrolyte is 2%
- (d) An example where the liquid amount ratio between the positive electrolyte and the negative electrolyte is 1.05 and the SOC of the mixture electrolyte is 2%

The liquid amount ratio is defined as [the liquid amount of the positive electrolyte/the liquid amount of the negative electrolyte]. In other words, when the liquid amount ratio is 1.05, the liquid amount of the positive electrolyte is 1.05 time as large as the liquid amount of the negative electrolyte. Regarding the SOC of the mixture electrolyte, a quantity of charged electricity at the time of mixing of the positive electrolyte and the negative electrolyte at a ratio equal to the liquid amount ratio is expressed with the SOC of the positive electrolyte. In cases (a) and (c), the positive electrolyte and the negative electrolyte are mixed at a ratio of 1:1. In cases (b) and (d), the positive electrolyte and the negative electrolyte are mixed at a ratio of 1.05:1.

The discharge capacity is calculated as below.

A ratio of the liquid amount of the positive electrolyte to a total of the liquid amount of the positive electrolyte and the liquid amount of the negative electrolyte is expressed as $\{r/(r+1)\}$ where r represents the ratio of the liquid amount of the positive electrolyte to the liquid amount of the negative electrolyte. The discharge capacity is expressed as below using liquid amount ratio r.

Discharge capacity (Ah/L)=Faraday constant (C/mol)×concentration of positive electrode active material (mol/L)×positive electrode SOC range (%)×$\{r/(r+1)\}$/3600

The Faraday constant is defined as 96485 (C/mol).

The positive electrode SOC range refers to the range of use of the SOC of the positive electrolyte in charging and discharging.

The positive electrode SOC range is calculated as below.

Deviation of valence toward the positive electrolyte is discussed. The concentration of the positive electrode active material contained in the positive electrolyte is denoted as A (mol/L) and the SOC of the mixture electrolyte is denoted as x (%). The positive electrode active material is assumed to be present in the oxidized state by an amount corresponding to X (mol/L) calculated in accordance with [X (mol/L)=A (mol/L)×x (%)] with the positive electrolyte and the negative electrolyte having been mixed.

The concentration of the negative electrode active material contained in the negative electrolyte is denoted as B (mol/L) and the optimal range of the SOC of the negative electrolyte is set to a range from b1(%) to b2(%). With the optimal range of the SOC of the positive electrolyte once being ignored, the SOC in the late stage of discharging and the SOC in the late stage of charging of the positive electrolyte can be denoted as below.

SOC (%) in the late stage of discharging=$\{X+(B\times b1+X)/r\}/A(\%)$

SOC (%) in the late stage of charging=$\{X+(B\times b2+X)/r\}/A(\%)$

When the SOC is out of the optimal range of the SOC of the positive electrolyte, such a disadvantage as a side reaction or deposit of the active material occurs. When the optimal range of the SOC of the positive electrolyte is set to a range from a1(%) to a2(%), the SOC in the late stage of discharging and the SOC in the late stage of charging of the positive electrolyte satisfy conditions below.

The SOC (%) in the late stage of discharging is set to a larger value of $[\{X+(B\times b1+X)/r\}/A]$ and [a1].

The SOC (%) in the late stage of charging is set to a smaller value of $[\{X+(B\times b2+X)/r\}/A]$ and [a2].

The positive electrode SOC range is set to a value calculated in accordance with [SOC in the late stage of charging−SOC in the late stage of discharging].

TABLE 1

| Case | Discharge Capacity (Ah/L) |
|------|---------------------------|
| (a) | 8.04 |
| (b) | 7.71 |
| (c) | 7.91 |
| (d) | 8.22 |

As shown in Table 1, in case (d) where the liquid amount ratio between the positive electrolyte and the negative electrolyte is set to 1.05 and furthermore the SOC of the mixture electrolyte is set to 2%, the discharge capacity can be increased. In other words, the energy density can be improved.

Trial Calculation Example 2

The concentration of the positive electrode active material is set to 1.0 mol/L and the concentration of the negative electrode active material is set to 1.0 mol/L. The lower limit and the upper limit of the optimal range of the SOC of the positive electrolyte are set to 10% and 20%, respectively. The lower limit and the upper limit of the optimal range of the SOC of the negative electrolyte are set to 30% and 88%, respectively. A discharge capacity under this condition was calculated as in Trial Calculation Example 1. The discharge capacity was calculated for each case below. Table 2 shows the discharge capacity in each case.
- (e) An example where the positive electrolyte and the negative electrolyte are equal to each other in liquid amount and the SOC of the mixture electrolyte is zero (f) An example where the liquid amount ratio between the positive electrolyte and the negative electrolyte is 5.0 and the SOC of the mixture electrolyte is zero (g) An example where the positive electrolyte and the negative electrolyte are equal to each other in liquid amount and the SOC of the mixture electrolyte is 2%

(h) An example where the liquid amount ratio between the positive electrolyte and the negative electrolyte is 5.0 and the SOC of the mixture electrolyte is 2%

TABLE 2

| Case | Discharge Capacity (Ah/L) |
|------|---------------------------|
| (e) | — |
| (f) | 1.70 |
| (g) | — |
| (h) | 2.23 |

In this example, in cases (e) and (g), the range of use of the SOC of the positive electrolyte or the negative electrolyte is out of the optimal range of the SOC, and hence charging and discharging was determined as being impossible. As shown in Table 2, in case (h) where the liquid amount ratio between the positive electrolyte and the negative electrolyte was set to 5.0 and furthermore the SOC of the mixture electrolyte was set to 2%, the discharge capacity can be increased.

Trial Calculation Example 3

The concentration of the positive electrode active material is set to 1.0 mol/L and the concentration of the negative electrode active material is set to 1.0 mol/L. The lower limit and the upper limit of the optimal range of the SOC of the positive electrolyte are set to 60% and 80%, respectively. The lower limit and the upper limit of the optimal range of the SOC of the negative electrolyte are set to 22% and 43%, respectively. A discharge capacity under this condition was calculated as in Trial Calculation Example 1. The discharge capacity was calculated for each case below. Table 3 shows the discharge capacity in each case.

(i) An example where the positive electrolyte and the negative electrolyte are equal to each other in liquid amount and the SOC of the mixture electrolyte is zero (j) An example where the liquid amount ratio between the positive electrolyte and the negative electrolyte is 1.05 and the SOC of the mixture electrolyte is zero (k) An example where the positive electrolyte and the negative electrolyte are equal to each other in liquid amount and the SOC of the mixture electrolyte is 20%

(l) An example where the liquid amount ratio between the positive electrolyte and the negative electrolyte is 1.05 and the SOC of the mixture electrolyte is 20%

TABLE 3

| Case | Discharge Capacity (Ah/L) |
|------|---------------------------|
| (i) | — |
| (j) | — |
| (k) | 2.41 |
| (l) | 2.75 |

In this example, in cases (i) and (j), the range of use of the SOC of the positive electrolyte or the negative electrolyte is out of the optimal range of the SOC, and hence charging and discharging was determined as being impossible. As shown in Table 3, in case (1) where the liquid amount ratio between the positive electrolyte and the negative electrolyte was set to 1.05 and furthermore the SOC of the mixture electrolyte was set to 20%, the discharge capacity can be increased.

Trial Calculation Example 4

The concentration of the positive electrode active material is set to 1.0 mol/L and the concentration of the negative electrode active material is set to 1.0 mol/L. The lower limit and the upper limit of the optimal range of the SOC of the positive electrolyte are set to 30% and 40%, respectively. The lower limit and the upper limit of the optimal range of the SOC of the negative electrolyte are set to 30% and 80%, respectively. A discharge capacity under this condition was calculated as in Trial Calculation Example 1. The discharge capacity was calculated for each case below. Table 4 shows the discharge capacity in each case.

(m) An example where the positive electrolyte and the negative electrolyte are equal to each other in liquid amount and the SOC of the mixture electrolyte is zero (n) An example where the liquid amount ratio between the positive electrolyte and the negative electrolyte is 5.0 and the SOC of the mixture electrolyte is zero (o) An example where the positive electrolyte and the negative electrolyte are equal to each other in liquid amount and the SOC of the mixture electrolyte is 20%

(p) An example where the liquid amount ratio between the positive electrolyte and the negative electrolyte is 5.0 and the SOC of the mixture electrolyte is 20%

TABLE 4

| Case | Discharge Capacity (Ah/L) |
|------|---------------------------|
| (m) | 1.34 |
| (n) | — |
| (o) | — |
| (p) | 2.23 |

In this example, in cases (n) and (o), the range of use of the SOC of the positive electrolyte or the negative electrolyte is out of the optimal range of the SOC, and hence charging and discharging was determined as being impossible. As shown in Table 4, in case (p) where the liquid amount ratio between the positive electrolyte and the negative electrolyte was set to 5.0 and furthermore the SOC of the mixture electrolyte was set to 20%, the discharge capacity can be increased.

Trial Calculation Example 11

The concentration of the positive electrode active material is set to 1.0 mol/L and the concentration of the negative electrode active material is set to 1.05 mol/L. The lower limit and the upper limit of the optimal range of the SOC of the positive electrolyte are set to 20% and 80%, respectively. The lower limit and the upper limit of the optimal range of the SOC of the negative electrolyte are set to 16.1% and 76.1%, respectively. A discharge capacity under this condition was calculated as in Trial Calculation Example 1. The discharge capacity was calculated for each of cases (a) to (d) above. Table 5 shows the discharge capacity in each case.

TABLE 5

| Case | Discharge Capacity (Ah/L) |
|------|---------------------------|
| (a) | 8.03 |
| (b) | 7.70 |
| (c) | 7.92 |
| (d) | 8.24 |

As shown in Table 5, in case (d) where the liquid amount ratio between the positive electrolyte and the negative electrolyte was set to 1.05 and furthermore the SOC of the mixture electrolyte was set to 2%, the discharge capacity can be increased.

Trial Calculation Example 12

The concentration of the positive electrode active material is set to 1.0 mol/L and the concentration of the negative electrode active material is set to 5.0 mol/L. The lower limit and the upper limit of the optimal range of the SOC of the positive electrolyte are set to 20% and 80%, respectively. The lower limit and the upper limit of the optimal range of the SOC of the negative electrolyte are set to 17.6% and 77.6%, respectively. A discharge capacity under this condition was calculated as in Trial Calculation Example 1. The discharge capacity was calculated for each of cases (e) to (h) above. Table 6 shows the discharge capacity in each case.

TABLE 6

| Case | Discharge Capacity (Ah/L) |
|------|---------------------------|
| (e) | — |
| (f) | 12.9 |
| (g) | — |
| (h) | 13.4 |

In this example, in cases (e) and (g), the range of use of the SOC of the positive electrolyte or the negative electrolyte is out of the optimal range of the SOC, and hence charging and discharging was determined as being impossible. As shown in Table 6, in case (h) where the liquid amount ratio between the positive electrolyte and the negative electrolyte was set to 5.0 and furthermore the SOC of the mixture electrolyte was set to 2%, the discharge capacity can be increased.

Trial Calculation Example 13

The concentration of the positive electrode active material is set to 1.0 mol/L and the concentration of the negative electrode active material is set to 1.05 mol/L. The lower limit and the upper limit of the optimal range of the SOC of the positive electrolyte are set to 50% and 80%, respectively. The lower limit and the upper limit of the optimal range of the SOC of the negative electrolyte are set to 11% and 41%, respectively. A discharge capacity under this condition was calculated as in Trial Calculation Example 1. The discharge capacity was calculated for each of cases (i) to (l) above. Table 7 shows the discharge capacity in each case.

TABLE 7

| Case | Discharge Capacity (Ah/L) |
|------|---------------------------|
| (i) | — |
| (j) | — |

TABLE 7-continued

| Case | Discharge Capacity (Ah/L) |
|------|---------------------------|
| (k) | 3.82 |
| (l) | 4.12 |

In this example, in cases (i) and (j), the range of use of the SOC of the positive electrolyte or the negative electrolyte is out of the optimal range of the SOC, and hence charging and discharging was determined as being impossible. As shown in Table 7, in case (1) where the liquid amount ratio between the positive electrolyte and the negative electrolyte was set to 1.05 and furthermore the SOC of the mixture electrolyte was set to 20%, the discharge capacity can be increased.

Trial Calculation Example 14

The concentration of the positive electrode active material is set to 1.0 mol/L and the concentration of the negative electrode active material is set to 5.0 mol/L. The lower limit and the upper limit of the optimal range of the SOC of the positive electrolyte are set to 50% and 80%, respectively. The lower limit and the upper limit of the optimal range of the SOC of the negative electrolyte are set to 26% and 56%, respectively. A discharge capacity under this condition was calculated as in Trial Calculation Example 1. The discharge capacity was calculated for each of cases (m) to (p) above. Table 8 shows the discharge capacity in each case.

TABLE 8

| Case | Discharge Capacity (Ah/L) |
|------|---------------------------|
| (m) | — |
| (n) | 1.3 |
| (o) | — |
| (p) | 6.7 |

In this example, in cases (m) and (o), the range of use of the SOC of the positive electrolyte or the negative electrolyte is out of the optimal range of the SOC, and hence charging and discharging was determined as being impossible. As shown in Table 8, in case (p) where the liquid amount ratio between the positive electrolyte and the negative electrolyte was set to 5.0 and furthermore the SOC of the mixture electrolyte was set to 20%, the discharge capacity can be increased.

It can be seen in Trial Calculation Examples 1 to 4 and Trial Calculation Examples 11 to 14 described above that the discharge capacity of the RF battery can be improved by setting the liquid amount ratio between the positive electrolyte and the negative electrolyte to at least 1.05 and at most 5.0 and setting the SOC of the mixture electrolyte to at least 2% and at most 20%. Trial Calculation Examples described above are by way of example. By setting the liquid amount ratio and the SOC of the mixture electrolyte to be within specific ranges in the RF battery in accordance with the concentration of the active material or the range of use of the SOC of each of the positive electrolyte and the negative electrolyte, the discharge capacity in the initial state can be increased. In other words, the effect of improvement in energy density is obtained.

In Trial Calculation Examples described above, the positive electrode active material and the negative electrode active material can be interchanged and the positive electrolyte and the negative electrolyte can be interchanged. Trial Calculation Examples described above assume that each active material undergoes a one-electron reaction. When the active material undergoes a reaction of two or more electrons, however, similar calculation should only be made with a maximum value of the SOC being set to [100%×the number of reactive electrons].

REFERENCE SIGNS LIST 1 redox flow battery (RF battery)
2 positive electrolyte; 3 negative electrolyte
10 battery cell
  101 membrane; 102 positive cell; 103 negative cell
  104 positive electrode; 105 negative electrode
12 positive electrolyte tank; 13 negative electrolyte tank
  108, 109 supply pipe; 110, 111 return pipe
  112, 113 pump
100 cell stack
20 sub stack
21 supply/drainage plate
22 end plate; 23 fastening mechanism
30 cell frame
31 bipolar plate; 32 frame body
33, 34 liquid supply manifold; 35, 36 liquid discharge manifold
33s, 34s liquid feed slit; 35s, 36s liquid discharge slit
80 AC/DC converter; 81 transformer facility
90 power system; 91 power generation unit; 92 load

The invention claimed is:

1. A redox flow battery comprising:
a positive electrolyte containing a positive electrode active material; and
a negative electrolyte containing a negative electrode active material, wherein
a liquid amount of the positive electrolyte is different from a liquid amount of the negative electrolyte,
of the positive electrolyte and the negative electrolyte, a liquid amount ratio of the electrolyte larger in liquid amount to the electrolyte smaller in liquid amount is not lower than 1.05 and not higher than 5.0,
a state of charge of a mixture electrolyte which is a mixture of the positive electrolyte and the negative electrolyte at a ratio equal to the liquid amount ratio is equal to or higher than 2% and equal to or lower than 20%,
the state of charge of the mixture electrolyte is defined as $(m/Cp) \times 100$ [%] when a condition of m>0 is satisfied and is defined as $(m/Cn) \times 100$ [%] when a condition of m<0 is satisfied,
the m is defined as $(Cpo \cdot vp - Cnr \cdot vn)/(vp+vn)$ [mol/L],
the Cp is a total concentration of the positive electrode active material and is expressed as Cp=Cpr+Cpo,
the Cn is a total concentration of the negative electrode active material and is expressed as Cn=Cnr+Cno,
the Cpr is a concentration (mol/L) of a reductant of the positive electrode active material,
the Cpo is a concentration (mol/L) of an oxidant of the positive electrode active material,
the Cnr is a concentration of a reductant of the negative electrode active material,
the Cno is a concentration of an oxidant of the negative electrode active material,
the vp is the liquid amount (L) of the positive electrolyte, and
the vn is the liquid amount (L) of the negative electrolyte.

2. The redox flow battery according to claim 1, comprising:
a positive electrolyte tank where the positive electrolyte is stored; and
a negative electrolyte tank where the negative electrolyte is stored, wherein
of the positive electrolyte tank and the negative electrolyte tank, a ratio of a volume of the tank where the electrolyte larger in liquid amount is stored to a volume of the tank where the electrolyte smaller in liquid amount is stored is not lower than 1.0 and not higher than 6.0.

3. The redox flow battery according to claim 1, wherein the positive electrode active material and the negative electrode active material are metallic ions composed of an identical element.

4. The redox flow battery according to claim 3, wherein the metallic ions include vanadium ions.

5. The redox flow battery according to claim 1, wherein the positive electrode active material and the negative electrode active material are metallic ions composed of elements different from each other.

6. The redox flow battery according to claim 5, wherein the positive electrode active material is at least one type of metallic ions selected from the group consisting of iron ions, vanadium ions, and manganese ions, and the negative electrode active material is at least one type of metallic ions selected from the group consisting of zinc ions, chromium ions, vanadium ions, and titanium ions.

7. The redox flow battery according to claim 1, wherein the liquid amount of the positive electrolyte is greater than the liquid amount of the negative electrolyte, and the liquid amount ratio of the positive electrolyte to the negative electrolyte is not lower than 1.05 and not higher than 5.0.

8. A redox flow battery comprising:
a positive electrolyte containing a positive electrode active material; and
a negative electrolyte containing a negative electrode active material, wherein
a liquid amount of the positive electrolyte is different from a liquid amount of the negative electrolyte,
of the positive electrolyte and the negative electrolyte, a liquid amount ratio of the electrolyte larger in liquid amount to the electrolyte smaller in liquid amount is not lower than 1.05 and not higher than 5.0,
a state of charge of a mixture electrolyte which is a mixture of the positive electrolyte and the negative electrolyte at a ratio equal to the liquid amount ratio is not lower than 2% and not higher than 20%,
the positive electrode active material is at least one type of metallic ions selected from the group consisting of iron ions, vanadium ions, and manganese ions, and
the negative electrode active material is at least one type of metallic ions selected from the group consisting of zinc ions, chromium ions, vanadium ions, and titanium ions.

9. The redox flow battery according to claim 8, wherein the liquid amount of the positive electrolyte is greater than the liquid amount of the negative electrolyte, and the liquid amount ratio of the positive electrolyte to the negative electrolyte is not lower than 1.05 and not higher than 5.0.

* * * * *